United States Patent
Xian et al.

(10) Patent No.: US 11,342,960 B2
(45) Date of Patent: May 24, 2022

(54) RELAY DEVICE, RELAY METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Yuanjun Xian, Yokkaichi (JP); Makoto Mashita, Yokkaichi (JP); Takeshi Hagihara, Yokkaichi (JP); Akihito Iwata, Osaka (JP); Takehiro Kawauchi, Osaka (JP); Ichiro Kanda, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/273,080

(22) PCT Filed: Aug. 21, 2019

(86) PCT No.: PCT/JP2019/032535
§ 371 (c)(1),
(2) Date: Mar. 3, 2021

(87) PCT Pub. No.: WO2020/050014
PCT Pub. Date: Mar. 12, 2020

(65) Prior Publication Data
US 2021/0328624 A1    Oct. 21, 2021

(30) Foreign Application Priority Data

Sep. 3, 2018   (JP) .............................. JP2018-164660

(51) Int. Cl.
*H04L 67/12* (2022.01)
*H04B 3/36* (2006.01)

(52) U.S. Cl.
CPC ............... *H04B 3/36* (2013.01); *H04L 67/12* (2013.01)

(58) Field of Classification Search
CPC ................... B60R 16/023; H04B 3/36; H04L 2012/40273; H04L 12/4625; H04L 2012/40215; H04L 67/12; H04L 12/40
See application file for complete search history.

(56) References Cited

U.S. PATENT DOCUMENTS

2010/0103859 A1* 4/2010 Isoyama ............. H04L 12/4015
370/315
2011/0243139 A1  10/2011 Nishimura
(Continued)

FOREIGN PATENT DOCUMENTS

JP    2006-229887 A    8/2006
JP    2006287738 A * 10/2006 ............. H04L 12/46
(Continued)

OTHER PUBLICATIONS

International Search Report, Application No. PCT/JP2019/032535 dated Nov. 5, 2019. ISA/Japan Patent Office.

*Primary Examiner* — David S Huang
(74) *Attorney, Agent, or Firm* — Honigman LLP

(57) ABSTRACT

In a relay device, a communication unit receives a data frame transmitted cyclically through a communication line. A control unit stores, in a temporary storage unit, the data frame received by the communication unit. When the data frame stored in the temporary storage unit is transmitted, the control unit deletes the transmitted data frame from the temporary storage unit. When the control unit determines that, for the data frame received through the communication line, the amount of data relevant to the data frames stored in
(Continued)

the temporary storage unit is equal to or greater than a threshold value, the communication unit transmits, through the communication line, a cycle change frame which gives an instruction to change a transmission cycle for transmitting the data frame to a longer cycle.

12 Claims, 8 Drawing Sheets

(56) References Cited

U.S. PATENT DOCUMENTS

| | | | | |
|---|---|---|---|---|
| 2014/0154971 | A1* | 6/2014 | Tanaka | H04B 7/14 |
| | | | | 455/7 |
| 2018/0203685 | A1* | 7/2018 | Nakamura | H04L 67/12 |
| 2019/0173952 | A1* | 6/2019 | Tauchi | H04L 67/12 |

FOREIGN PATENT DOCUMENTS

| | | |
|---|---|---|
| JP | 2010-28355 A | 2/2010 |
| JP | 2011211530 A | 10/2011 |
| JP | 2016-51916 A | 4/2016 |

* cited by examiner

FIG. 10
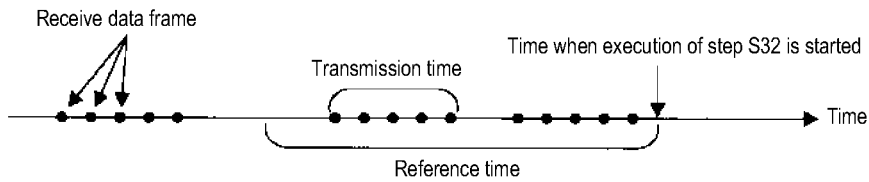
FIG. 11
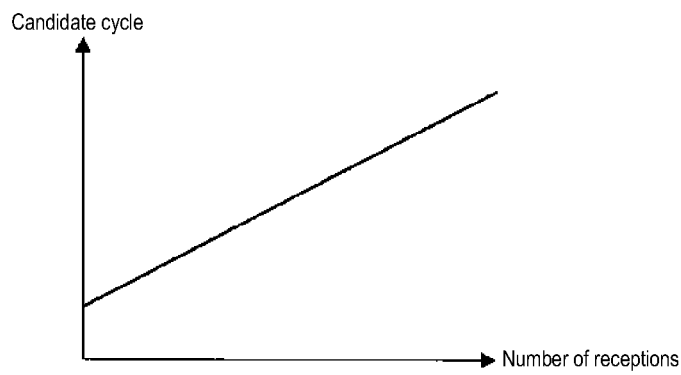
FIG. 12
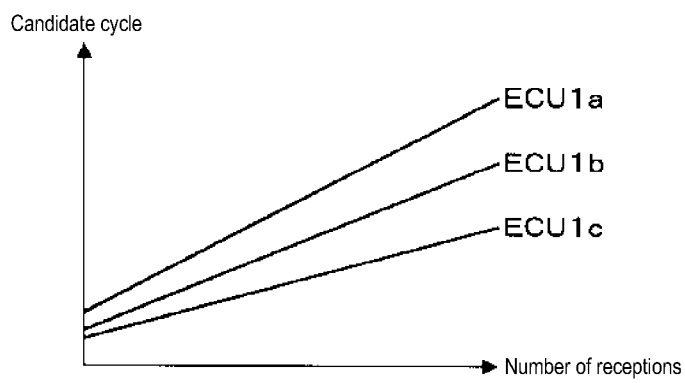
FIG. 13
| Data Frame | Transmission Data | Transmission Source |
|---|---|---|
| First type of data frame | First application data | ECU1a |
| Second type of data frame | Second application data | ECU1a |
| Third type of data frame | Third application data | ECU1b |
| Fourth type of data frame | Fourth application data | ECU1c |

RELAY DEVICE, RELAY METHOD, AND COMPUTER PROGRAM

CROSS-REFERENCE TO RELATED APPLICATIONS

This application is the U.S. national stage of PCT/JP2019/032535 filed on Aug. 21, 2019, which claims priority of Japanese Patent Application No. JP 2018-164660 filed on Sep. 3, 2018, the contents of which are incorporated herein.

TECHNICAL FIELD

The present disclosure relates to a relay device, a relay method, and a computer program.

BACKGROUND

Japanese Patent Laid-Open Publication No. 2016-51916 discloses a communication system for a vehicle in which a relay device relays communication between two communication devices. In this communication system, the relay device is connected to one end of each of two communication lines. The other ends of the two communication lines are connected to the two communication devices, respectively. The relay device receives data from one communication device through the communication line. The relay device transmits the received data to the other communication device through the communication line. In communication through two communication lines, a protocol for Ethernet (registered trademark) is used.

In a conventional relay device that relays communication using a protocol for Ethernet, data received through one of the two communication lines is stored in a storage unit. The data stored in the storage unit is transmitted through the other communication line. In the conventional relay device, when data is transmitted, the transmitted data is deleted from the storage unit. The amount of data stored in the storage unit changes according to the amount of data received per unit time and according to the amount of data transmitted per unit time.

In the conventional relay device, when the amount of data stored in the storage unit becomes a value close to the upper limit value, data that gives an instruction to stop the transmission, is transmitted to the communication device which is a transmission source of data. Reception of data from the communication device is stopped until the amount of data is reduced to a small value.

When the reception of data from the communication device is stopped in the conventional relay device, transmission from the communication device as a transmission source to the communication device as a transmission destination is stopped until the amount of data stored in the storage unit becomes a small value. In this case, in the communication device as a transmission destination, processing based on the data received from the communication device as a transmission source may not be performed at an appropriate timing.

For example, it is assumed that the communication device is configured to transmit data giving an instruction to open the window when the occupant of a vehicle operates an operation unit. When the communication device as a transmission source is instructed to stop the transmission at the point in time when the occupant operates the operation unit, the communication device does not transmit data until the amount of data in the storage unit is reduced to a small value. For this reason, it takes a long time to open the window, which may make the occupant feel uncomfortable.

Therefore, it is an object to provide a relay device, a relay method, and a computer program in which the amount of data stored in the storage unit is unlikely to reach the upper limit value.

SUMMARY

A relay device according to an aspect of the present disclosure receives data transmitted cyclically through a communication line and transmits the received data. The relay device includes: a storage unit in which the data received through the communication line is stored; a first transmission unit that transmits the data stored in the storage unit; a deletion unit that deletes, from the storage unit, the data transmitted by the first transmission; a data amount determination unit that determines, for the data received through the communication line, whether or not an amount of data stored in the storage unit is equal to or greater than a threshold value; and a second transmission unit that transmits, through the communication line, change data which gives an instruction to change a transmission cycle for transmitting data to a longer cycle, when the data amount determination unit determines that the amount of data is equal to or greater than the threshold value.

A relay method according to an aspect of the present disclosure includes: storing, in a storage unit, data which is cyclically transmitted from a communication device through a communication line; transmitting the data stored in the storage unit; deleting the transmitted data from the storage unit; determining, for the data transmitted from the communication device through the communication line, whether or not an amount of data stored in the storage unit is equal to or greater than a threshold value; and transmitting, through the communication line, change data which gives an instruction to change a transmission cycle for transmitting data to a longer cycle, when it is determined that the amount of data is equal to or greater than the threshold value.

A computer program according to an aspect of the present disclosure causes a computer to execute: storing, in a storage unit, data which is cyclically transmitted from a communication device through a communication line; giving an instruction to transmit the data stored in the storage unit; deleting the transmitted data from the storage unit; determining, for the data transmitted from the communication device through the communication line, whether or not an amount of data stored in the storage unit is equal to or greater than a threshold value; and giving an instruction to transmit, through the communication line, change data which gives an instruction to change a transmission cycle for transmitting data to a longer cycle, when it is determined that the amount of data is equal to or greater than the threshold value.

Not only can the present disclosure be realized as a relay device including such characteristic processing units, but also the present disclosure can be realized as a relay method including such characteristic processes as steps or can be realized as a computer program causing a computer to execute such steps. In addition, the present disclosure can be realized as a semiconductor integrated circuit that realizes a part or the entirety of a relay device, or can be realized as a communication system including a relay device.

First, embodiments of the present disclosure will be listed and described. At least some of the embodiments described below may be arbitrarily combined.

A relay device according to an aspect of the present disclosure receives data transmitted cyclically through a communication line and transmits the received data. The relay device includes: a storage unit in which the data received through the communication line is stored; a first transmission unit that transmits the data stored in the storage unit; a deletion unit that deletes, from the storage unit, the data transmitted by the first transmission; a data amount determination unit that determines, for the data received through the communication line, whether or not an amount of data stored in the storage unit is equal to or greater than a threshold value; and a second transmission unit that transmits, through the communication line, change data which gives an instruction to change a transmission cycle for transmitting data to a longer cycle, when the data amount determination unit determines that the amount of data is equal to or greater than the threshold value.

A relay device according to an aspect of the present disclosure includes a determination unit that determines the transmission cycle after change, based on the number of data reception through the communication line within a predetermined period.

In a relay device according to an aspect of the present disclosure, the number of communication lines is two or more. The data transmitted cyclically through each of the plurality of communication lines is received. A plurality of data received through the plurality of communication lines are stored in the storage unit. The data amount determination unit determines, for each of the plurality of data received respectively through the plurality of communication lines, whether or not the amount of data stored in the storage unit is equal to or greater than a threshold value. When the data amount determination unit determines that the amount of data is equal to or greater than the threshold value for at least one of the plurality of data received respectively through the plurality of communication lines, the second transmission unit transmits the change data through the communication line through which data determined that the amount of data is equal to or greater than the threshold value is transmitted.

In a relay device according to an aspect of the present disclosure, two of a plurality of threshold values for the plurality of data received respectively through the plurality of communication lines are different from each other.

In a relay device according to an aspect of the present disclosure, the number of communication lines is two or more. A plurality of types of data that are cyclically transmitted are received through a plurality of communication lines. The plurality of types of data received through the plurality of communication lines are stored in the storage unit. The data amount determination unit determines, for each of the plurality of types of data, whether or not the amount of data stored in the storage unit is equal to or greater than a threshold value. When the data amount determination unit determines that the amount of data is equal to or greater than the threshold value for at least one type of data among the plurality of types of data, the second transmission unit transmits the change data through the communication line through which data determined that the amount of data is equal to or greater than the threshold value is transmitted.

In a relay device according to an aspect of the present disclosure, the type of data is determined by an application program relevant to a process using the data.

In a relay device according to an aspect of the present disclosure, two of a plurality of threshold values for the plurality of types of data are different from each other.

A relay method according to an aspect of the present disclosure includes: storing, in a storage unit, data which is cyclically transmitted from a communication device through a communication line; transmitting the data stored in the storage unit; deleting the transmitted data from the storage unit; determining, for the data transmitted from the communication device through the communication line, whether or not an amount of data stored in the storage unit is equal to or greater than a threshold value; and transmitting, through the communication line, change data which gives an instruction to change a transmission cycle for transmitting data to a longer cycle, when it is determined that the amount of data is equal to or greater than the threshold value.

A computer program according to an aspect of the present disclosure causes a computer to execute: storing, in a storage unit, data which is cyclically transmitted from a communication device through a communication line; giving an instruction to transmit the data stored in the storage unit; deleting the transmitted data from the storage unit; determining, for the data transmitted from the communication device through the communication line, whether or not an amount of data stored in the storage unit is equal to or greater than a threshold value; and giving an instruction to transmit, through the communication line, change data which gives an instruction to change a transmission cycle for transmitting data to a longer cycle, when it is determined that the amount of data is equal to or greater than the threshold value.

In the relay device, the relay method, and the computer program according to the aspect described above, when the amount of data stored in the storage unit becomes equal to or greater than the threshold value, the change data is transmitted, through the communication line, to the communication device which is a transmission source of a data. Therefore, the transmission cycle of the data transmitted from the communication device through the communication line becomes long, so that the increase in the amount of data is suppressed. As a result, the possibility that the amount of data stored in the storage unit will reach the upper limit value is low.

In the relay device according to the aspect described above, the transmission cycle after change is determined to be an appropriate cycle based on the number of data reception through the communication line within a predetermined period.

In the relay device according to the aspect described above, the transmission cycle of data, the amount of which is equal to or greater than the threshold value, among the plurality of data transmitted respectively through the plurality of communication lines, is changed to a longer cycle. The transmission cycle of the data, the amount of which is less than the threshold value, is not changed. As a result, data is efficiently transmitted.

In the relay device according to the aspect described above, all the threshold values for the plurality of data received respectively through the plurality of communication lines are not the same and are set separately.

In the relay device according to the aspect described above, the transmission cycle of the type of data, the amount of which is equal to or greater than the threshold value, among the plurality of types of data, is changed to a longer cycle. The transmission cycle of the type of data, the amount of which is less than the threshold value, is not changed. As a result, a plurality of types of data are efficiently transmitted.

In the relay device according to the aspect described above, the data used in the process according to one application program is one type of data.

In the relay device according to the aspect described above, all the threshold values for the plurality of types of data are not the same and are appropriately set.

Advantageous Effects

According to the present disclosure, it is unlikely that the amount of data stored in the storage unit will reach the upper limit.

BRIEF DESCRIPTION OF THE DRAWINGS

FIG. 10 is an explanatory diagram of the number of receptions relevant to the ECU.

FIG. 11 is a graph showing the relationship between a candidate cycle and the number of receptions.

FIG. 12 is an explanatory diagram of the candidate cycle for the ECU.

FIG. 13 is an explanatory diagram of four types of data frames in Embodiment 2.

DETAILED DESCRIPTION OF PREFERRED EMBODIMENTS

Specific examples of communication systems according to embodiments of the present disclosure will be described below with reference to the diagrams. In addition, the present invention is not limited to these examples but is defined by the claims, and is intended to include all modifications within the meaning and scope equivalent to the claims.

Embodiment 1

Figure 1:
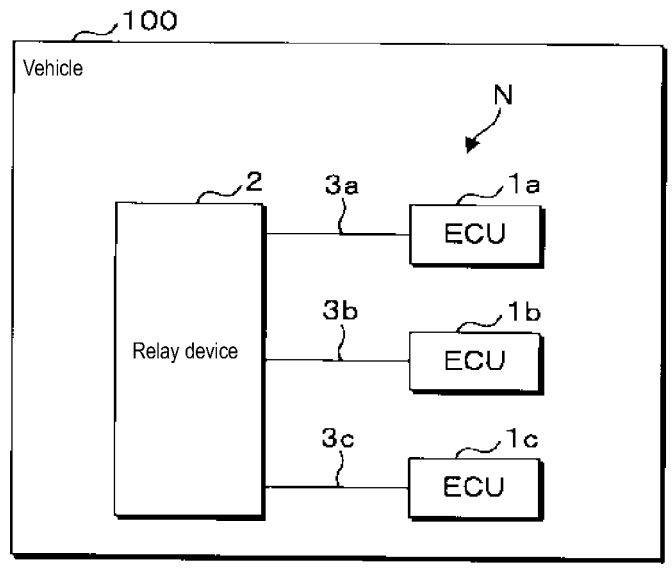
FIG. 1 is a block diagram showing the main configuration of a communication system according to Embodiment 1.

FIG. 1 is a block diagram showing the main configuration of a communication system N according to Embodiment 1. The communication system N is mounted in a vehicle 100. The communication system N includes three ECUs (Electronic Control Units) 1a, 1b, and 1c, a relay device 2, and three communication lines 3a, 3b, and 3c. The ECUs 1a, 1b, and 1c are connected to ends of the communication lines 3a, 3b, and 3c, respectively. The other ends of the communication lines 3a, 3b, and 3c are connected to the relay device 2.

The ECUs 1a, 1b, and 1c function as communication devices. The ECUs 1a, 1b and 1c transmit partial data to the relay device 2 through the communication lines 3a, 3b, and 3c, respectively. The partial data is a part of transmission data to be transmitted. In the communication system N, partial data is transmitted by transmitting a data frame including the partial data. The data frame includes not only the partial data but also transmission destination data and transmission source data (refer to FIG. 3). The transmission destination data indicates a device as a transmission destination of a data frame. The transmission source data indicates a device as a transmission source of a data frame. The device as a transmission destination is one of the three ECUs 1a, 1b, and 1c. The device as a transmission source is also one of the three ECUs 1a, 1b, and 1c.

Figure 2:
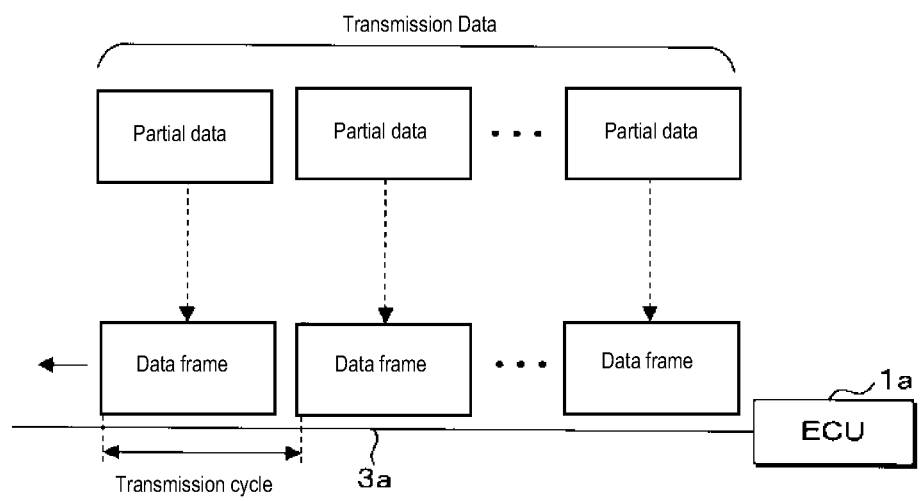
FIG. 2 is an explanatory diagram of transmission performed by an ECU.

FIG. 2 is an explanatory diagram of transmission performed by the ECU 1a. As shown in FIG. 2, transmission data is configured by a plurality of partial data. The ECU 1a transmits a plurality of partial data configuring the transmission data, by transmitting a plurality of data frames. The ECU 1a cyclically transmits a data frame to the relay device 2 through the communication line 3a until the transmission of all the partial data configuring the transmission data is completed.

The transmission cycle for transmitting a data frame is a period from the start of transmission of one data frame to the start of transmission of the next data frame. The ECU 1a suddenly starts the cyclical transmission of data frames relevant to one transmission data.

The transmission performed by each of the ECUs 1b and 1c is similar to the transmission performed by the ECU 1a. In the description of the transmission performed by the ECU 1a, the ECU 1a and the communication line 3a are replaced with the ECU 1b and the communication line 3b, respectively. In this manner, it is possible to understand the transmission performed by the ECU 1b. Similarly, in the description of the transmission performed by the ECU 1a, the ECU 1a and the communication line 3a are replaced with the ECU 1c and the communication line 3c, respectively. In this manner, it is possible to understand the transmission performed by the ECU 1c.

The relay device 2 receives a plurality of data frames from the three ECUs 1a, 1b, and 1c through the three communication lines 3a, 3b, and 3c. When the relay device 2 receives a data frame through one of the three communication lines 3a, 3b, and 3c, the relay device 2 transmits, through one of the three communication lines 3a, 3b and 3c, the received data frame to the ECU which is indicated by the transmission destination data of the received data frame. In this manner, the relay device 2 relays the communication performed by two of the three ECUs 1a, 1b, and 1c.

Each of the ECUs 1a, 1b, and 1c performs control related to an electric device mounted in the vehicle 100. The three ECUs 1a, 1b, and 1c communicate with one another through the relay device 2. At least two of the ECUs 1a, 1b, and 1c cooperate with one another. For example, when a person touches the door knob of the vehicle 100, data that gives an instruction to unlock the door is input to the ECU 1a. The ECU 1a transmits a plurality of data frames to the ECU 1c through the relay device 2, the plurality of data frames being relevant to the transmission data that gives an instruction to unlock the door. When the ECU 1c receives all the data frames relevant to the transmission data, the ECU 1c outputs the data that gives an instruction to unlock the door. As a result, the door is unlocked.

The relay device 2 transmits a cycle change frame to the ECUs 1a, 1b, and 1c through the communication lines 3a, 3b, and 3c, respectively. The cycle change frame gives an instruction to change the transmission cycle of the data frame. Each of the ECUs 1a, 1b, and 1c changes the transmission cycle of the data frame according to the instruction of the cycle change frame.

In communication through the communication lines 3a, 3b, and 3c, for example, a protocol for Ethernet is used. Communication through each of the communication lines 3a, 3b, and 3c is one-to-one communication. Therefore, the number of devices connected to each of the communication lines 3a, 3b, and 3c is two.

Figure 3:
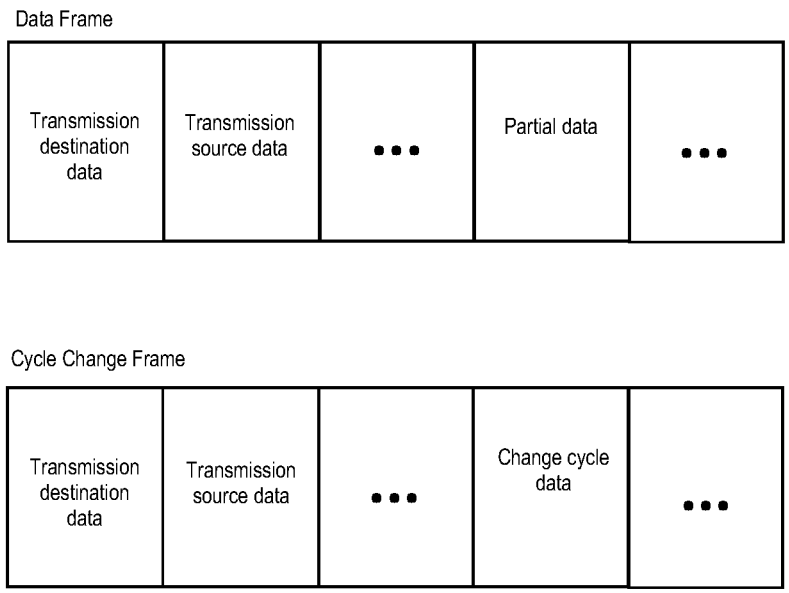
FIG. 3 is an explanatory diagram of a data frame and a cycle change frame.

FIG. 3 is an explanatory diagram of a data frame and a cycle change frame. As described above, the data frame includes transmission destination data, transmission source data, and partial data. The cycle change frame includes change cycle data indicating the cycle. When each of the ECUs 1a, 1b, and 1c receives the cycle change frame from the relay device 2, each of the ECUs 1a, 1b, and 1c changes the transmission cycle to the cycle indicated by the change cycle data of the received cycle change frame. Therefore, the change cycle data of the cycle change frame indicates a transmission cycle after the change.

The cycle change frame further includes: transmission destination data indicating a device as a transmission destination of a cycle change frame; and transmission source data indicating a device as a transmission source of a cycle change frame. The device as a transmission destination indicated by the transmission destination data of the cycle change frame is one of the three ECUs 1a, 1b, and 1c. The device as a transmission source indicated by the transmission source data of the cycle change frame is the relay device 2.

Figure 4:
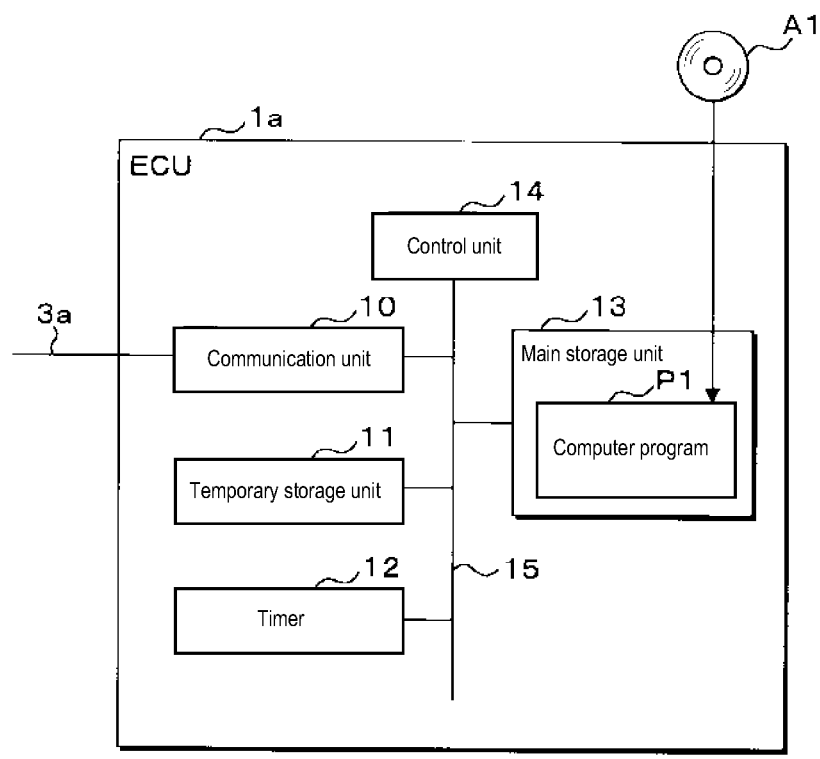
FIG. 4 is a block diagram showing the main configuration of an ECU.

FIG. 4 is a block diagram showing the main configuration of the ECU 1a. The ECU 1a includes a communication unit 10, a temporary storage unit 11, a timer 12, a main storage unit 13, and a control unit 14. These are connected to an internal bus 15 in the ECU 1a. The communication unit 10 is further connected to the communication line 3a.

The communication unit 10 transmits a data frame through the communication line 3a according to the instruction of the control unit 14. In addition, the communication unit 10 receives the data frame and the cycle change frame through the communication line 3a. The control unit 14 acquires, from the communication unit 10, the data frame and the cycle change frame received by the communication unit 10.

The control unit 14 generates transmission data. The control unit 14 stores the generated transmission data in the temporary storage unit 11. The control unit 14 further stores transmission data as control data used to control the electric device, the transmission data being configured by a plurality of partial data included in the plurality of data frames received by the communication unit 10. The data stored in the temporary storage unit 11 is read out by the control unit 14. The control unit 14 deletes the data stored in the temporary storage unit 11. The temporary storage unit 11 temporarily stores the data. For example, when the supply of power to the temporary storage unit 11 is stopped, the data stored in the temporary storage unit 11 is deleted.

The timer 12 starts and ends time measurement according to the instruction of the control unit 14. The control unit 14 reads out, from the timer 12, the measurement time measured by the timer 12.

The main storage unit 13 is a non-volatile memory. Transmission cycle data is stored in the main storage unit 13. The transmission cycle data indicates the transmission cycle of the data frame. The control unit 14 changes the transmission cycle indicated by the transmission cycle data, to a cycle indicated by the change cycle data of the cycle change frame received by the communication unit 10.

A computer program P1 is further stored in the main storage unit 13. The control unit 14 includes one or more CPUs (Central Processing Units). One or more CPUs included in the control unit 14 execute the computer program P1 to perform a control data storage process, a control process, a transmission data storage process, an ECU-side transmission process, and a cycle change process.

The control data storage process and the transmission data storage process are processes for storing control data and transmission data, respectively. The control process is a process of controlling an electric device based on the control data. The ECU-side transmission process is a process of transmitting a plurality of partial data configuring the transmission data. The cycle change process is a process of changing the transmission cycle.

The computer program P1 may be stored in a storage medium A1 so as to be readable by one or more CPUs included in the control unit 14. In this case, the computer program P1 read out from the storage medium A1 by a reader (not shown) is stored in the main storage unit 13. The storage medium A1 is an optical disk, a flexible disk, a magnetic disk, a magnetic optical disk, a semiconductor memory, or the like. The optical disk is a CD (Compact Disc)-ROM (Read Only Memory), a DVD (Digital Versatile Disc)-ROM, a BD (Blu-ray (registered trademark) Disc), or the like. The magnetic disk is, for example, a hard disk. The computer program P1 may be downloaded from an external device (not shown) connected to a communication network (not shown). The downloaded computer program P1 may be stored in the main storage unit 13.

The control unit 14 performs the control data storage process when the communication unit 10 receives a data frame in a state in which the control data storage process is not performed. In the control data storage process, the control unit 14 stores the transmission data as control data in temporary storage unit 11, the transmission data being configured by the plurality of partial data received by the communication unit 10.

Specifically, until the communication unit 10 completes the reception of all the data frames relevant to one transmission data, the control unit 14 stores partial data, which is included in the data frame received by the communication unit 10, in the temporary storage unit 11 each time the communication unit 10 receives the data frame. When the communication unit 10 completes the reception of all the data frames relevant to one transmission data, that is, when all the partial data configuring one transmission data are stored in the temporary storage unit 11, the control unit 14 ends the control data storage process. As described above, the control unit 14 treats the transmission data received by the communication unit 10 as control data.

When the communication unit 10 receives a data frame after the end of the control data storage process, the control unit 14 performs the control data storage process again. When the communication unit 10 receives a data frame during the execution of the control data storage process, the control unit 14 does not newly start the control data storage process.

The control unit 14 performs the control process when control data is stored in the temporary storage unit 11. In the control process, the control unit 14 performs processing based on the control data stored in the temporary storage unit 11. For example, the control unit 14 causes an output unit (not shown) to output data giving an instruction for a specific operation, so that an electric device performs the specific operation. Thereafter, the control unit 14 deletes, from the temporary storage unit 11, the control data relevant to the executed processing. Then, the control unit 14 ends the control process. When other control data are stored in the temporary storage unit 11 after the end of the control process, the control unit 14 performs the control process again.

The control unit 14 performs the transmission data storage process, for example, when data indicating a sensor detection result, data giving an instruction for a specific operation, or the like is input to an input unit (not shown). In the transmission data storage process, the control unit 14 generates transmission data based on the data input to the input unit. The control unit 14 stores the generated transmission data in the temporary storage unit 11. Thereafter, the control unit 14 ends the transmission data storage process.

Figure 5:
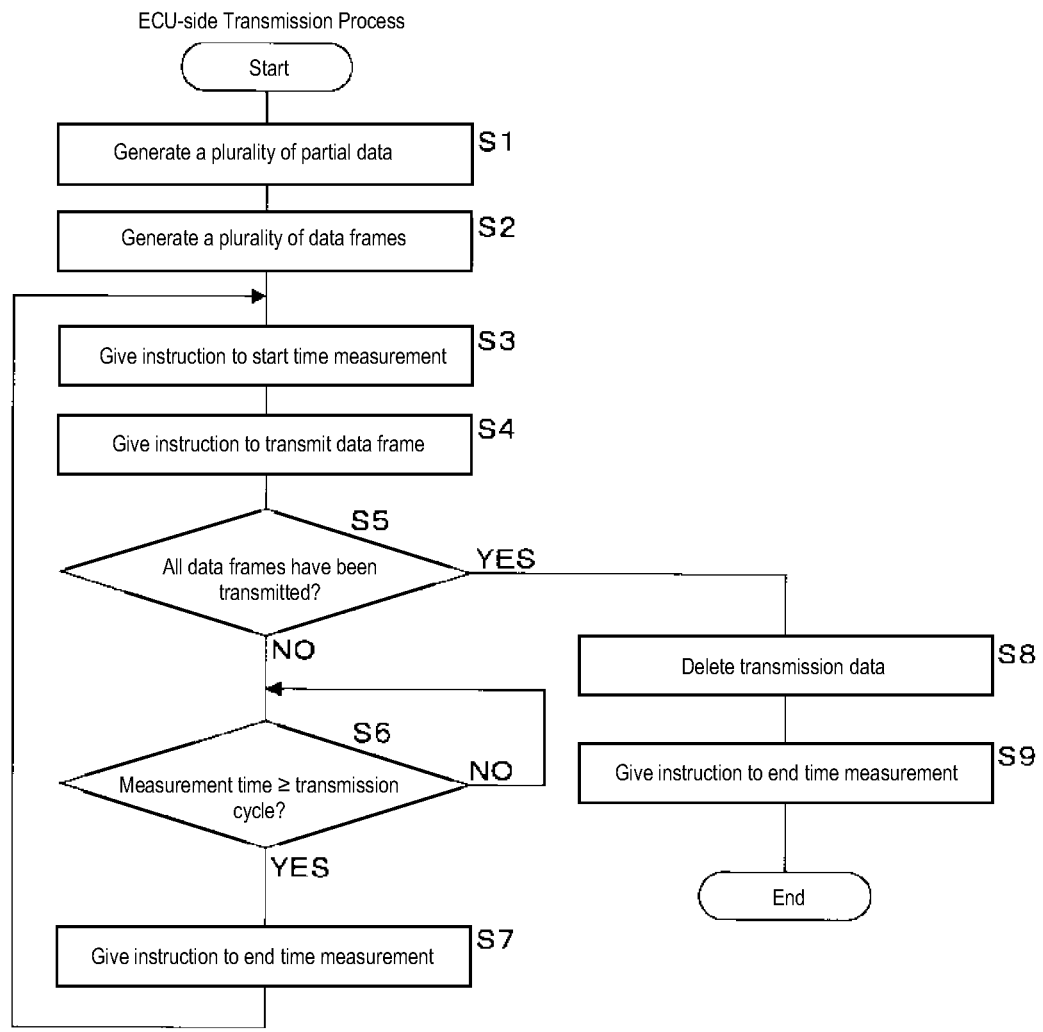
FIG. 5 is a flowchart showing the procedure of an ECU-side transmission process.

FIG. 5 is a flowchart showing the procedure of the ECU-side transmission process. The control unit 14 performs the ECU-side transmission process when the transmission data generated in the transmission data storage process is stored in the temporary storage unit 11. In the ECU-side transmission process, the control unit 14 first generates a plurality of partial data configuring the transmission data to be transmitted (step S1). Then, the control unit 14 generates a plurality of data frames respectively including the plurality of generated partial data (step S2).

After executing step S2, the control unit 14 instructs the timer 12 to start time measurement (step S3). As a result, the timer 12 starts the time measurement. Then, the control unit 14 instructs the communication unit 10 to transmit one data frame among the plurality of data frames generated in step S2 (step S4). As a result, the communication unit 10 transmits a data frame to the relay device 2 through the communication line 3a.

Then, the control unit 14 determines whether or not the communication unit 10 has transmitted all the data frames generated in step S2 (step S5). When it is determined that the communication unit 10 has not transmitted all the data frames (S5: NO), the control unit 14 determines whether or not the measurement time measured by the timer 12 is equal to or longer than the transmission cycle indicated by the transmission cycle data (step S6). When it is determined that the measurement time is less than the transmission cycle (S6: NO), the control unit 14 executes step S6 and waits until the measurement time becomes equal to or longer than the transmission cycle.

When it is determined that the measurement time is equal to or longer than the transmission cycle (S6: YES), the control unit 14 instructs the timer 12 to end the time measurement (step S7). As a result, the timer 12 ends the time measurement. Then, the control unit 14 executes step S3. The control unit 14 repeatedly executes step S4 until the communication unit 10 transmits all the data frames generated in step S2. The control unit 14 repeatedly executes step S4 so that the communication unit 10 sequentially transmits a plurality of data frames generated in step S2.

When it is determined that the communication unit 10 has transmitted all the data frames (S5: YES), the control unit 14 deletes the transmission data transmitted by the communication unit 10 (step S8). Then, the control unit 14 instructs the timer 12 to end the time measurement (step S9). As a result, the timer 12 ends the time measurement. After executing step S9, the control unit 14 ends the ECU-side transmission process. When another transmission data is stored in the temporary storage unit 11, the control unit 14 performs the ECU-side transmission process again.

The control unit 14 performs the ECU-side transmission process so that the communication unit 10 sequentially transmits data frames to the relay device 2 at the transmission cycle indicated by the transmission cycle data, as shown in FIG. 2.

The control unit 14 performs the cycle change process when the communication unit 10 receives a cycle change frame from the relay device 2 through the communication line 3a. In the cycle change process, the control unit 14 changes the transmission cycle to a cycle indicated by the change cycle data of the cycle change frame received by the communication unit 10, the transmission cycle being indicated by the transmission cycle data stored in the main storage unit 13.

The control unit 14 performs the ECU-side transmission process so that the communication unit 10 transmits the plurality of data frames. The transmission cycle of the plurality of data frames is changed to the cycle indicated by the change cycle data.

After changing the transmission cycle, the control unit 14 ends the cycle change process.

The configuration of each of the ECUs 1b and 1c is similar to that of the ECU 1a. In the description of the configuration of the ECU 1a, the ECU 1a and the communication line 3a are replaced with the ECU 1b and the communication line 3b, respectively. In this manner, the configuration of the ECU 1b can be explained. In the description of the configuration of the ECU 1a, the ECU 1a and the communication line 3a are replaced with the ECU 1c and the communication line 3c, respectively. In this manner, the configuration of the ECU 1c can be explained.

Figure 6:
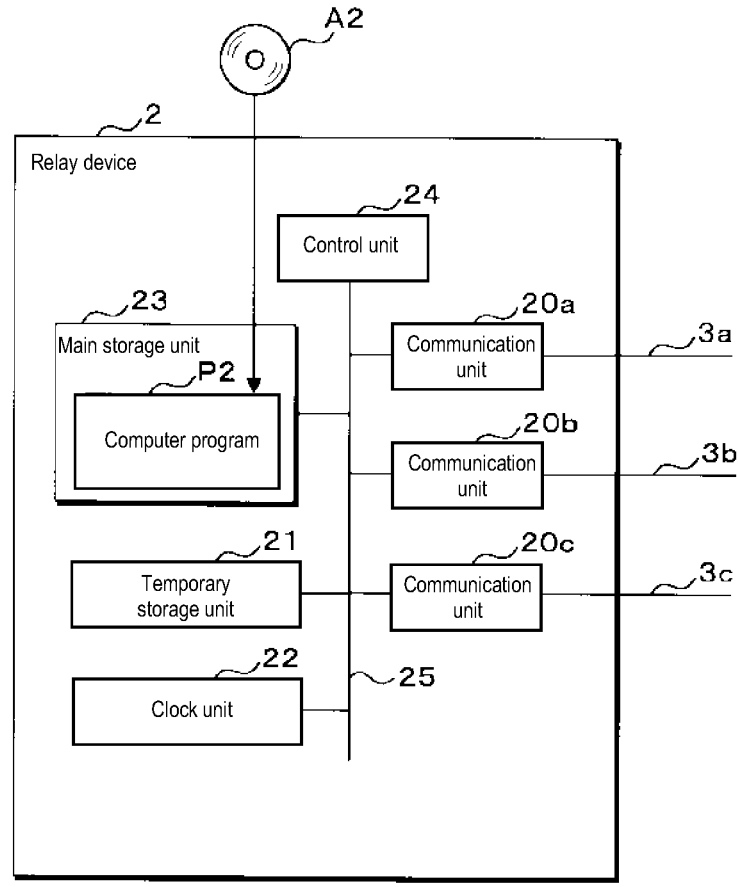
FIG. 6 is a block diagram showing the main configuration of a relay device.

FIG. 6 is a block diagram showing the main configuration of the relay device 2. The relay device 2 includes three communication units 20a, 20b, and 20c, a temporary storage unit 21, a clock unit 22, a main storage unit 23, and a control unit 24. These are connected to an internal bus 25 in the relay device 2. The communication units 20a, 20b, and 20c are further connected to the communication lines 3a, 3b, and 3c, respectively.

The communication units 20a, 20b, and 20c transmit a data frame and a cycle change frame through the communication lines 3a, 3b, and 3c, respectively, according to the instruction of the control unit 24. The data frames and the cycle change frames transmitted by the communication units 20a, 20b, and 20c are received by the communication units 10 of the ECUs 1a, 1b, and 1c, respectively.

The communication units 20a, 20b, and 20c receive the data frames through the communication lines 3a, 3b, and 3c, respectively. Therefore, the data frames transmitted by the communication units 10 of the ECUs 1a, 1b, and 1c are received by the communication units 20a, 20b, and 20c of the relay device 2, respectively.

The control unit 24 stores, in the temporary storage unit 21, the data frames received by the communication units 20a, 20b, and 20c. The control unit 24 stores reception time data in the temporary storage unit 21. The reception time data indicates: the date and time when the data frame is received by one of the communication units 20a, 20b, and 20c; and a device as a transmission source of the received data frame. The device as a transmission source is one of the ECUs 1a, 1b, and 1c.

The control unit 24 reads out, from the temporary storage unit 21, the data frame and the reception time data stored in the temporary storage unit 21. The control unit 24 deletes the data frame stored in the temporary storage unit 21. Data is temporarily stored in the temporary storage unit 21. For example, when the supply of power to the temporary storage unit 21 is stopped, all the data stored in the temporary storage unit 21 are deleted.

The control unit 24 acquires, from the clock unit 22, date and time data indicating the date and time. The date and time data acquired by the control unit 24 indicates the date and time when the control unit 24 acquires the date and time data.

The main storage unit 23 is a non-volatile memory. Basic cycle data is stored in the main storage unit 23. The basic cycle data indicates a fixed basic cycle that is basically set as a transmission cycle. The control unit 24 reads out the basic cycle data from the main storage unit 23.

A computer program P2 is further stored in the main storage unit 23. The control unit 24 includes one or more CPUs. One or more CPUs included in the control unit 24 execute the computer program P2 to perform the device-side storage process, the device-side transmission process, and three data amount adjustment processes relevant to the three ECUs 1a, 1b, and 1c in parallel.

The device-side storage process is a process of storing the data frame in the temporary storage unit 21. The device-side transmission process is a process of transmitting the data frame stored in the temporary storage unit 21. The three data amount adjustment processes are processes of adjusting the amounts of data received through the communication lines 3a, 3b, and 3c, respectively. The computer program P2 is used to cause one or more CPUs of the control unit 24 to perform the device-side storage process, the device-side transmission process, and the three data amount adjustment processes.

The computer program P2 may be stored in a storage medium A2 so as to be readable by one or more CPUs included in the control unit 24. In this case, the computer program P2 read out from the storage medium A2 by a reader (not shown) is stored in the main storage unit 23. The storage medium A2 is an optical disk, a flexible disk, a magnetic disk, a magnetic optical disk, a semiconductor memory, or the like. The computer program P2 may be downloaded from an external device (not shown) connected to a communication network (not shown). The downloaded computer program P2 may be stored in the main storage unit 23.

Figure 7:
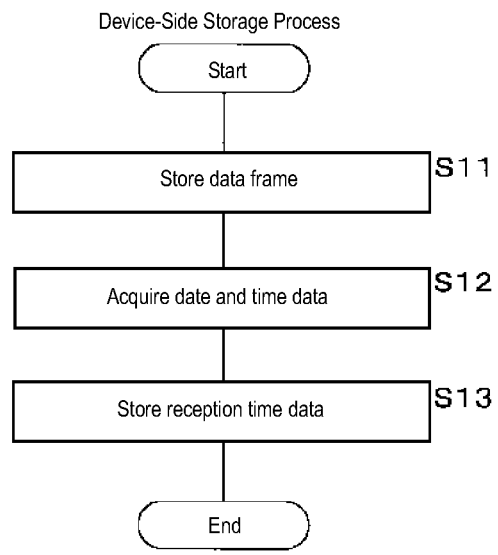
FIG. 7 is a flowchart showing the procedure of a device-side storage process.

FIG. 7 is a flowchart showing the procedure of the device-side storage process. The control unit 24 performs the device-side storage process when one of the communication units 20a, 20b, and 20c receives a data frame. In the device-side storage process, first, the control unit 24 stores the data frame received by one of the communication units 20a, 20b, and 20c in the temporary storage unit 21 (step S11).

Then, the control unit 24 acquires date and time data from the clock unit 22 (step S12), and stores the reception time data in the temporary storage unit 21 (step S13). The reception time data indicates: a device as a transmission source indicated by the transmission source data of the received data frame; and the date and time indicated by the date and time data acquired in step S12. After executing step S13, the control unit 24 ends the device-side storage process.

Figure 8:
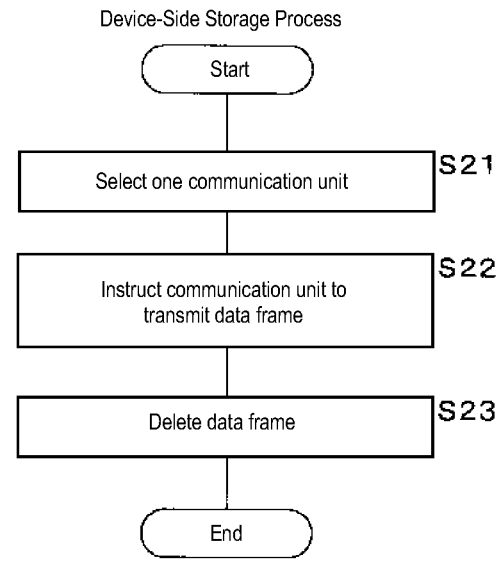
FIG. 8 is a flowchart showing the procedure of a device-side transmission process.

FIG. 8 is a flowchart showing the procedure of the device-side transmission process. The control unit 24 performs the device-side transmission process when the data frame is stored in the temporary storage unit 21. In the device-side transmission process, the control unit 24 selects one communication unit among the three communication units 20a, 20b, and 20c based on a device as a transmission destination indicated by the transmission destination data of the data frame to be transmitted (step S21).

As described above, the device as a transmission destination indicated by the transmission destination data is one of the ECUs 1a, 1b, and 1c. The ECUs 1a, 1b, and 1c correspond to the communication units 20a, 20b, and 20c, respectively. In step S21, the control unit 24 selects, among the communication units 20a, 20b, and 20c, a communication unit corresponding to the device as a transmission destination indicated by the transmission destination data of the data frame to be transmitted. For example, when the device as a transmission destination is the ECU 1a, the control unit 24 selects the communication unit 20a.

Then, the control unit 24 instructs the communication unit selected in step S21 to transmit the data frame to be transmitted that is stored in the temporary storage unit 21 (step S22). As a result, the communication unit selected in step S21 transmits the data frame to be transmitted, which is stored in the temporary storage unit 21, to the communication unit 10 of one of the ECUs 1a, 1b, and 1c through the communication line connected to itself. For example, when the communication unit 20a is selected in step S21, the control unit 24 instructs the communication unit 20a to transmit the data frame to be transmitted in step S22. As a result, the communication unit 20a transmits the data frame to be transmitted, to the communication unit 10 of the ECU 1a through the communication line 3a connected to itself. Each of the communication units 20a, 20b, and 20c functions as a first transmission unit.

After executing step S22, the control unit 24 deletes the data frame to be transmitted, which has been transmitted by the communication unit selected in step S21, from the temporary storage unit 21 (step S23). The control unit 24 functions as a deletion unit.

After executing step S23, the control unit 24 ends the device-side transmission process.

As described above, each time one of the communication units 20a, 20b, and 20c receives a data frame through one of the communication lines 3a, 3b, and 3c, the control unit 24 stores the received data frame in the temporary storage unit 21. The data frame stored in the temporary storage unit 21 is transmitted by one of the communication units 20a, 20b, and 20c. The data frame to be transmitted is deleted from the temporary storage unit 21. Therefore, the amount of data stored in the temporary storage unit 21 changes according to the amount of data received by the communication units 20a, 20b, and 20c per unit time and according to the amount of data transmitted by the communication units 20a, 20b, and 20c per unit time.

Each time one of the communication units 20a, 20b, and 20c receives a data frame, the reception time data indicating: the date and time when the data frame is received; and the device as a transmission source of the received data frame, is stored in the temporary storage unit 21.

Figure 9:
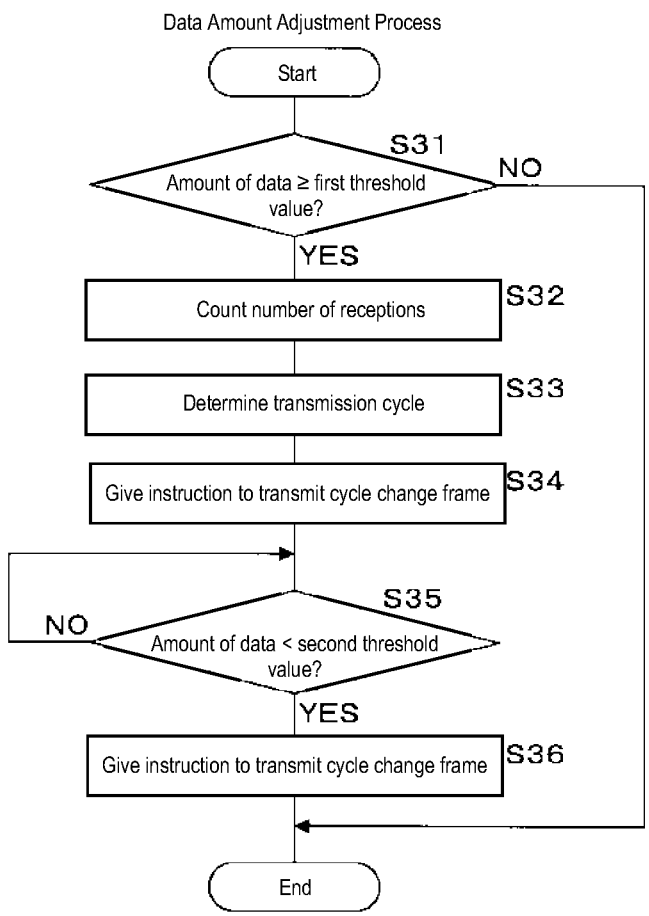
FIG. 9 is a flowchart showing the procedure of a data amount adjustment process.

FIG. 9 is a flowchart showing the procedure of the data amount adjustment process. Here, the data amount adjustment process relevant to the ECU 1a will be described. The control unit 24 cyclically performs the data amount adjustment process relevant to the ECU 1a. At the point in time when the control unit 24 performs the data amount adjustment process relevant to the ECU 1a, the transmission cycle data of the ECU 1a indicates the above-described basic cycle as a transmission cycle.

In the data amount adjustment process, the control unit 24 determines, for data relevant to the data frame received from the communication unit 10 of the ECU 1a through the communication line 3a, whether or not the amount of data stored in the temporary storage unit 21 is equal to or greater than a first threshold value (step S31). The first threshold value is fixed, and is set in advance. The control unit 24 also functions as a data amount determination unit.

When the control unit 24 determines that the amount of data is equal to or greater than the first threshold value (S31: YES), the control unit 24 counts the number of receptions by which the communication unit 20a has received the data frame from the ECU 1a through the communication line 3a within the reference time (step S32).

FIG. 10 is an explanatory diagram of the number of receptions relevant to the ECU 1a. In FIG. 10, on the time axis, a point in time (date and time) when the communication unit 20a receives a data frame from the ECU 1a through the communication line 3a is shown by a black circle. The number of receptions is the number of times by which data frames are received from the ECU 1a through the communication line 3a during a period from the time which is traced back by the reference time from the start of the execution of step S32, to the time when the execution of step S32 is started. The reference time is sufficiently longer than the maximum transmission time required for the transmission of all the data frames relevant to one transmission data.

In the example of FIG. 10, the number of receptions is 10. In step S32, the number of receptions is counted based on a plurality of reception time data stored in the temporary storage unit 21. The example of FIG. 10 is an example in which five data frames are used to transmit one transmission data. In the example of FIG. 10, three transmission data are transmitted. The transmission of each of the three transmission data is not started cyclically, but is started suddenly.

Then, the control unit 24 determines a transmission cycle for the ECU 1a based on the number of receptions counted in step S32 (step S33). The relationship between a candidate cycle and the number of receptions is stored in advance in the main storage unit 23. The candidate cycle is a candidate for the transmission cycle. In step S33, the control unit 24 determines the transmission cycle based on the stored relationship.

FIG. 11 is a graph showing the relationship between the candidate cycle and the number of receptions. FIG. 11 shows a candidate cycle for the ECU 1a. The relationship shown in FIG. 11 is stored in advance in the main storage unit 23. As shown in FIG. 11, the candidate cycle becomes longer as the number of receptions becomes larger. In step S33, the control unit 24 determines the transmission cycle so that the transmission cycle becomes a candidate cycle corresponding to the number of receptions counted in step S32. In addition, the minimum value of the candidate cycle is longer than the basic cycle. Therefore, the transmission cycle determined in step S33 is longer than the basic cycle.

Then, the control unit 24 instructs the communication unit 20a to transmit a cycle change frame (step S34). Here, the cycle indicated by the change cycle data of the cycle change frame is the transmission cycle determined in step S33. The control unit 24 executes step S34 so that the communication unit 20a transmits the cycle change frame to the ECU 1a.

In the ECU 1a, when the communication unit 10 receives the cycle change frame, the control unit 14 performs the cycle change process to change the transmission cycle indicated by the transmission cycle data from the basic cycle to the cycle indicated by the change cycle data of the cycle change frame. As a result, the transmission cycle of the data frame transmitted from the communication unit 20a of the ECU 1a to the communication unit 20a of the relay device 2 through the communication line 3a is changed from the basic cycle to the transmission cycle determined in step S33. As described above, the changed transmission cycle is longer than the basic cycle, and becomes longer as the number of receptions relevant to the ECU 1a becomes larger. The control unit 24 also functions as a determination unit.

After executing step S34, the control unit 24 determines, for data relevant to the data frame received from the communication unit 10 of the ECU 1a, whether or not the amount of data stored in the temporary storage unit 21 is less than a second threshold value (step S35). The second threshold value is fixed, and is set in advance. The second threshold value is smaller than the first threshold value.

When it is determined that the amount of data is equal to or greater than the second threshold value (S35: NO), the control unit 24 executes step S35, and waits until the amount of data relevant to the data frame received from the communication unit 10 of the ECU 1a becomes less than the second threshold value. During this waiting period, when transmitting transmission data, the communication unit 20a of the ECU 1a transmits a plurality of data frames to the communication unit 20a of the relay device 2 at the transmission cycle determined in step S33.

When it is determined that the amount of data is less than the second threshold value (S35: YES), the control unit 24 instructs the communication unit 20a to transmit a cycle change frame having the change cycle data indicating the basic cycle (step S36). As a result, the communication unit 20a transmits the cycle change frame to the ECU 1a through the communication line 3a.

In the ECU 1a, when the communication unit 10 receives the cycle change frame, the control unit 14 performs the cycle change process to change the transmission cycle indicated by the transmission cycle data to the cycle indicated by the change cycle data of the cycle change frame. As a result, the transmission cycle of the data frame transmitted from the communication unit 20a of the ECU 1a to the communication unit 20a of the relay device 2 through the communication line 3a is returned to the basic cycle.

When it is determined that the amount of data is less than the first threshold value (S31: NO) or after executing step S36, the control unit 24 ends the data amount adjustment process.

As described above, when the amount of data relevant to the data frame, transmission source of which is the ECU 1a, becomes equal to or greater than the first threshold value in a state in which the transmission cycle of the data frame transmitted by the communication unit 10 of the ECU 1a is the basic cycle, the transmission cycle is changed to a cycle longer than the basic cycle. The larger the number of receptions, the longer the transmission cycle after change, that is, the transmission cycle determined in step S33. When the amount of data relevant to the data frame, transmission source of which is the ECU 1a, is less than the second threshold value, the transmission cycle is returned to the basic cycle.

The control unit 24 performs the data amount adjustment process relevant to each of the ECUs 1b and 1c in the similar manner as the data amount adjustment process relevant to the ECU 1a. In the description of the data amount adjustment process relevant to the ECU 1a, the ECU 1a, the communication line 3a, and the communication unit 20a are replaced with the ECU 1b, the communication line 3b, and the communication unit 20b, respectively. In this manner, it is possible to understand the data amount adjustment process relevant to the ECU 1b. In the description of the data amount adjustment process relevant to the ECU 1a, the ECU 1a, the communication line 3a, and the communication unit 20a are replaced with the ECU 1c, the communication line 3c, and the communication unit 20c, respectively. In this manner, it is possible to understand the data amount adjustment process relevant to the ECU 1c.

The control unit 24 performs the data amount adjustment processes relevant to the ECUs 1a, 1b, and 1c. Therefore, it is assumed that the control unit 24 determines that, for the data frame received through at least one of the three communication lines 3a, 3b, and 3c, the amount of data relevant to the data frame stored in the temporary storage unit 21 is equal to or greater than the first threshold value. In this case, one of the three communication units 20a, 20b, and 20c transmits a cycle change frame to the ECU that is a transmission source of the data for which it has been determined that the amount of data is equal to or greater than the first threshold value. The whole of the three communication units 20a, 20b, and 20c functions as a second transmission unit.

Two of the three first threshold values for the three data amount adjustment processes, that is, two of the three first threshold values for the three data frames received through the three communication lines 3a, 3b, and 3c, are different from each other. Therefore, all of the first threshold values for the three data amount adjustment processes are not the same and are appropriately set separately. Two of the three second threshold values for the three data amount adjustment processes are different from each other. For all of the three ECUs 1a, 1b, and 1c, the relationship between the candidate cycle and the number of receptions is not the same.

FIG. 12 is an explanatory diagram of candidate cycles for ECUs 1a, 1b, and 1c. FIG. 12 shows, for each of the ECUs 1a, 1b and 1c, the relationship between the candidate cycle and the number of receptions. As shown in FIG. 12, for each of the ECUs 1a, 1b, and 1c, the larger the number of receptions, the longer the candidate cycle. For the same number of receptions, the candidate cycle for the ECU 1a is longer than the candidate cycle for the ECU 1b. The candidate cycle for the ECU 1b is longer than the candidate cycle for the ECU 1c. In addition, the slope of the straight line for the ECU 1a is larger than the slope of the straight line for the ECU 1b. The slope of the straight line for the ECU 1b is larger than the slope of the straight line for the ECU 1c.

In the relay device 1, for the data frame received through one of the communication lines 3a, 3b, and 3c, when the amount of data relevant to the data frame stored in the temporary storage unit 21 becomes equal to or greater than the first threshold value, the cycle change frame is transmitted to the ECU that transmits the data frame, the amount of data relevant to which is equal to or greater than the first threshold value. The transmission cycle of the data frame transmitted through one of the three communication lines 3a, 3b, and 3c becomes long, so that the increase in the amount of data is suppressed. As a result, the possibility that the amount of data stored in the temporary storage unit 21 will exceed the upper limit value of the capacity of the temporary storage unit 21, that is, the possibility of overflow in the temporary storage unit 21, is low.

The transmission cycle of a data frame, the amount of data relevant of which is equal to or greater than the first threshold value, among the three data frames transmitted through the three communication lines 3a, 3b, and 3c, is changed from the basic cycle to a cycle longer than the basic cycle. The transmission cycle of the data frame, the amount of data relevant to which is less than the first threshold value, is not changed. As a result, data frames are efficiently transmitted.

The larger the number of receptions, the longer the transmission cycle after change, that is, the transmission cycle determined in step S33. As a result, the transmission cycle after change is determined to be an appropriate cycle for realizing a configuration in which the possibility of overflow is low and the transmission speed of transmission data is high.

The three first threshold values for the three data amount adjustment processes may be the same. The three second threshold values for the three data amount adjustment processes may also be the same. For relationship between the candidate cycle and the number of receptions, relationships of the three ECUs 1a, 1b and 1c may be the same.

Embodiment 2

In Embodiment 1, the control unit 24 of the relay device 2 determines whether or not the amount of data is equal to or greater than the first threshold value for each of the three data frames received by the three communication units 20a, 20b, and 20c through the three communication lines 3a, 3b, and 3c. However, the data frame relevant to the determination regarding whether or not the amount of data is equal to or greater than the first threshold value is not limited to the data frame classified by the device as a transmission source.

Hereinafter, the differences between Embodiments 1 and 2 will be described. Other configurations excluding the configuration to be described below are similar to those in Embodiment 1. Therefore, the similar components as in Embodiment 1 are denoted by the same reference numerals as in Embodiment 1, and the description thereof will be omitted.

In the communication system N according to Embodiment 2, the relay device 2 receives four types of data frames cyclically transmitted through the communication lines 3a, 3b, and 3c. Each of a first application program, a second application program, a third application program, and a fourth application program is executed by the control unit 14 in one of the three ECUs 1a, 1b, and 1c. As a result, various processes are performed.

In the process according to the first application program, first application data is used. In the process according to the second application program, second application data is used. In the process according to the third application program, third application data is used. In the process according to the fourth application program, fourth application data is used. Each of the first application data, the second application data, the third application data, and the fourth application data is transmission data.

FIG. 13 is an explanatory diagram of four types of data frames in Embodiment 2. The first type of data frame is a data frame including partial data of the first application data. The second type of data frame is a data frame including partial data of the second application data. The first type of data frame and the second type of data frame are transmitted by the communication unit 10 of the ECU 1a.

The third type of data frame is a data frame including partial data of the third application data. The third type of data frame is transmitted by the communication unit 10 of the ECU 1b. The fourth type of data frame is a data frame including partial data of the fourth application data. The fourth type of data frame is transmitted by the communication unit 10 of the ECU 1c. The type of data frame is determined by the application program in which partial data included in the data frame is used. The data frame including partial data of data used in the process according to one application program is one type of data frame.

Figure 14:
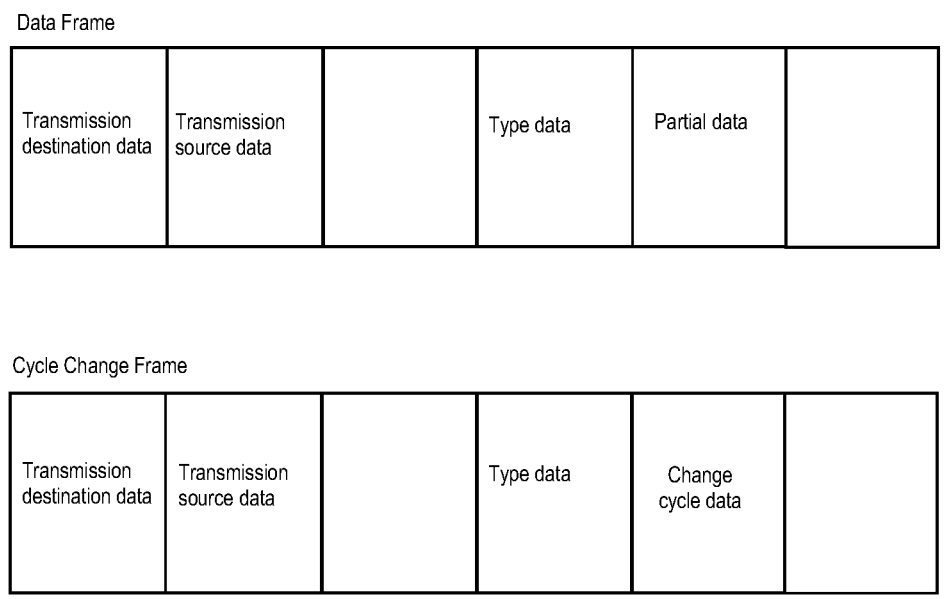
FIG. 14 is an explanatory diagram of a data frame and a cycle change frame.

FIG. 14 is an explanatory diagram of a data frame and a cycle change frame. The data frame transmitted by the communication unit 10 of each of the ECUs 1a, 1b, and 1c includes type data in addition to transmission destination data, transmission source data, and partial data. The type data indicates the type of the data frame.

The cycle change frame transmitted by the communication units 20a, 20b, and 20c of the relay device 2 includes type data in addition to transmission destination data, transmission source data, and change cycle data. The type data included in the cycle change frame indicates the type of data frame, transmission cycle of which is to be changed. The type data of each of the data frame and the cycle change frame indicates one of the first application program, the second application program, the third application program, and the fourth application program.

Figure 15:
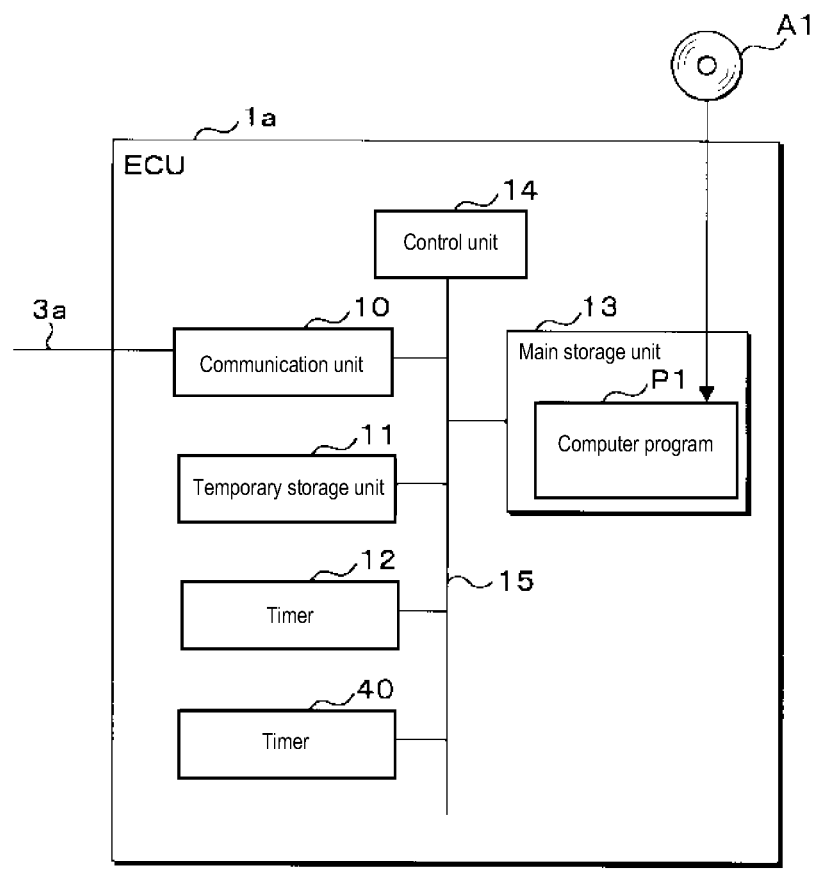
FIG. 15 is a block diagram showing the main configuration of an ECU.

FIG. 15 is a block diagram showing the main configuration of the ECU 1a. The ECU 1a in Embodiment 2 includes a timer 40 in addition to the components of the ECU 1a in Embodiment 1. The timer 40 is connected to the internal bus 15. Similarly to the timer 12, the timer 40 starts and ends time measurement according to the instruction of the control unit 14. The control unit 14 reads out, from the timer 40, the measurement time measured by the timer 40. The communication unit 10 transmits the first type of data frame and the second type of data frame through the communication line 3a according to the instruction of the control unit 14.

In Embodiment 2, the control unit 14 performs the control data storage process, the control process, and the transmission data storage process in the similar manner as in Embodiment 1. In the transmission data storage process, the control unit 14 generates first application data or second application data as transmission data. The control unit 14 stores the generated transmission data in the temporary storage unit 11. The control unit 14 performs both the transmission data storage process for generating the first application data and the transmission data storage process for generating the second application data.

In Embodiment 2, the control unit 14 performs the ECU-side transmission process and the cycle change process for the first type of data frame. Furthermore, the control unit 14 performs the ECU-side transmission process and the cycle change process for the second type of data frame. Transmission cycle data for the first type of data frame and transmission cycle data for the second type of data frame are stored in the main storage unit 23.

When the first application data is stored in the temporary storage unit 11 as transmission data, the control unit 14 performs the ECU-side transmission process for the first type of data frame in the similar manner as the ECU-side transmission process in Embodiment 1. In step S6 of the ECU-side transmission process for the first type of data frame, a transmission cycle indicated by the transmission cycle data for the first type of data frame is used.

When the second application data is stored in the temporary storage unit 11 as transmission data, the control unit 14 performs the ECU-side transmission process for the second type of data frame in the similar manner as the ECU-side transmission process in Embodiment 1. In the ECU-side transmission process for the second type of data frame, the control unit 14 instructs the timer 40 to start and end the time measurement instead of the timer 12. The control unit 14 reads out the measurement time measured by the timer 40. In step S6 of the ECU-side transmission process for the second type of data frame, a transmission cycle indicated by the transmission cycle data for the second type of data frame is used.

Therefore, the communication unit 10 of the ECU 1a transmits the first type of data frame to the communication unit 20a of the relay device 2 at the transmission cycle indicated by the transmission cycle data for the first type of data frame. In addition, the communication unit 10 of the ECU 1a transmits the second type of data frame to the communication unit 20a of the relay device 2 at the transmission cycle indicated by the transmission cycle data for the second type of data frame.

When the communication unit 10 receives the cycle change frame having type data indicating the first application program from the relay device 2 through the communication line 3a, the control unit 14 performs the cycle change process for the first type of data frame in the similar manner as the cycle change process in Embodiment 1. In the cycle change process for the first type of data frame, the transmission cycle indicated by the transmission cycle data for the first type of data frame is changed to the cycle indicated by the cycle change frame according to the first application program.

When the communication unit 10 receives the cycle change frame including type data indicating the second application program from the relay device 2 through the communication line 3a, the control unit 14 performs the cycle change process for the second type of data frame in the similar manner as the cycle change process in Embodiment 1. In the cycle change process for the second type of data frame, the transmission cycle indicated by the transmission cycle data for the second type of data frame is changed to the cycle indicated by the cycle change frame according to the second application program.

Each of the configurations of the ECUs 1b and 1c in Embodiment 2 is similar to the configuration of the ECU 1a in Embodiment 2. In the description of the configuration of the ECU 1b, the ECU 1a, the communication line 3a, the communication unit 20a, the first type of data frame, the first application program, and the first application data are replaced with the ECU 1b, the communication line 3b, the communication unit 20b, the third type of data frame, the third application program, and the third application data, respectively. In this manner, it is possible to understand the configuration of the ECU 1b.

Therefore, the communication unit 10 of the ECU 1b transmits the third type of data frame to the communication unit 20b of the relay device 2 at the transmission cycle indicated by the transmission cycle data for the third type of data frame. When the communication unit 10 receives the cycle change frame including type data indicating the third application program from the relay device 2 through the communication line 3b, the transmission cycle indicated by the transmission cycle data for the third type of data frame is changed to the cycle indicated by the cycle change frame according to the third application program.

The number of types of data frames transmitted by the communication unit 10 of the ECU 1b is 1. Therefore, the timer 40 is not necessary in the ECU 1b. The control unit 14 of the ECU 1b does not perform the ECU-side transmission process and the cycle change process for the second type of data frame.

Similarly, in the description of the configuration of the ECU 1a, the ECU 1a, the communication line 3a, the communication unit 20a, the first type of data frame, the first application program, and the first application data are replaced with the ECU 1c, the communication line 3c, the communication unit 20c, the fourth type of data frame, the fourth application program, and the fourth application data, respectively. In this manner, it is possible to understand the configuration of the ECU 1*c*.

Therefore, the communication unit 10 of the ECU 1*c* transmits the fourth type of data frame to the communication unit 20*c* of the relay device 2 at the transmission cycle indicated by the transmission cycle data for the fourth type of data frame. When the communication unit 10 receives the cycle change frame including type data indicating the fourth application program from the relay device 2 through the communication line 3*c*, the transmission cycle indicated by the transmission cycle data for the fourth type of data frame is changed to the cycle indicated by the cycle change frame according to the fourth application program.

The number of types of data frames transmitted by the communication unit 10 of the ECU 1*c* is 1. Therefore, the timer 40 is not necessary in the ECU 1*c*. The control unit 14 of the ECU 1*c* does not perform the ECU-side transmission process and the cycle change process for the second type of data frame.

In the relay device 2 in Embodiment 2, the control unit 24 performs the device-side storage process and the device-side transmission process in the similar manner as in Embodiment 1. In step S13 of the device-side storage process, the reception time data stored in the temporary storage unit 11 by the control unit 14 indicates not only the device as a transmission source and the date and time but also an application program indicated by the type data of the data frame received by one of the communication units 20*a*, 20*b*, and 20*c*. The control unit 24 performs the device-side storage process so that four types of data frames received through the three communication lines 3*a*, 3*b*, and 3*c* are stored in the temporary storage unit 21.

In Embodiment 2, the control unit 24 performs the data amount adjustment processes relevant to the first type, the second type, the third type, and the fourth type of data frames instead of the data amount adjustment processes relevant to the ECUs 1*a*, 1*b*, and 1*c*. The control unit 24 cyclically performs the data amount adjustment process relevant to the first type of data frame in the similar manner as the data amount adjustment process relevant to the ECU 1*a*.

In step S31, the control unit 24 determines, for data relevant to the first type of data frame received through one of the three communication lines 3*a*, 3*b*, and 3*c*, whether or not the amount of data stored in the temporary storage unit 21 is equal to or greater than the first threshold value. In step S32, the control unit 24 counts the number of receptions by which the three communication units 20*a*, 20*b*, and 20*c* have received the first type of data frame within the reference time. The number of receptions is the number of times by which the three communication units 20*a*, 20*b*, and 20*c* receive the first type of data frame during a period from the time traced back by the reference time from the start of the execution of step S32, to the time when the execution of step S32 is started.

In step S33, the control unit 24 determines a transmission cycle for the first type of data frame based on the number of receptions counted in step S32. The relationship between the candidate cycle and the number of receptions for the first type of data frame is stored in advance in the main storage unit 23. In step S33, the control unit 24 determines the transmission cycle based on the stored relationship. The minimum value of the candidate cycle for the first type of data frame is longer than the basic cycle. Therefore, the transmission cycle determined in step S33 is longer than the basic cycle.

In step S34, the control unit 24 instructs a communication unit connected to the device as a transmission source of the first type of data frame, among the three communication units 20*a*, 20*b*, and 20*c*, to transmit the cycle change frame. Here, for the cycle change frame, the type data indicates the first application program, and the cycle indicated by the change cycle data is the transmission cycle determined in step S33. The control unit 24 executes step S34 so that at least one of the three communication units 20*a*, 20*b*, and 20*c* transmits the cycle change frame to the ECU that is a transmission source of the first type of data frame, that is, the ECU 1*a*.

In the ECU 1*a*, when the communication unit 10 receives the cycle change frame including type data indicating the first application program, the control unit 14 performs the cycle change process for the first type of data frame. Therefore, the transmission cycle indicated by the transmission cycle data for the first type of data frame is changed from the basic cycle to the cycle indicated by the change cycle data of the cycle change frame. As a result, the transmission cycle of the first type of data frame is changed from the basic cycle to the transmission cycle determined in step S33. The transmission cycle after change is longer than the basic cycle as described above.

In step S35, it is determined, for data relevant to the first type of data frame, whether or not the amount of data stored in the temporary storage unit 21 is less than the second threshold value. Until the amount of data becomes less than the second threshold value, the first type of data frame is transmitted to the relay device 2 at the transmission cycle determined in step S33.

In step S36, the control unit 24 instructs the communication unit, which is connected to the device as a transmission source of the first type of data frame, to transmit the cycle change frame. Here, for the cycle change frame, the type data indicates the first application program, and the change cycle data indicates the basic cycle. The control unit 24 executes step S36 so that at least one of the three communication units 20*a*, 20*b*, and 20*c* transmits the cycle change frame to the ECU that is a transmission source of the first type of data frame, that is, the ECU 1*a*. As a result, the transmission cycle of the first type of data frame is returned to the basic cycle.

As described above, when the amount of data relevant to the first type of data frame becomes equal to or greater than the first threshold value in a state in which the transmission cycle of the first type of data frame is the basic cycle, the transmission cycle of the first type of data frame is changed to a cycle longer than the basic cycle. When the amount of data relevant to the first type of data frame becomes less than the second threshold value, the transmission cycle of the first type of data frame is returned to the basic cycle.

The control unit 24 performs the data amount adjustment process relevant to each of the second type, the third type, and the fourth type of data frames in the similar manner as the data amount adjustment process relevant to the first type of data frame. In the data amount adjustment process relevant to the third type of data frame, the transmission destination of the cycle change frame is the ECU 1*b*. In the data amount adjustment process relevant to the fourth type of data frame, the transmission destination of the cycle change frame is the ECU 1*c*. The second type of data frame, the third type of data frame, and the fourth type of data frame correspond to the second application program, the third application program, and the fourth application program, respectively.

The control unit 24 performs data amount adjustment processes relevant to the four types of data frames. Therefore, it is assumed that the control unit 24 determines that, for at least one type of data frame among the four types of data frames, the amount of data relevant to the data frame stored in the temporary storage unit 21 is equal to or greater than the first threshold value. In this case, one of the three communication units 20a, 20b, and 20c transmits a cycle change frame to the ECU that is a transmission source of the data for which it has been determined that the amount of data is equal to or greater than the first threshold value.

Two of the four first threshold values for the four types of data frames are different from each other. Therefore, all the first threshold values for the four types of data frames are not the same and are appropriately set separately. Two of the four second threshold values for the four types of data frames are different from each other. For all of the four types of data frames, the relationship between the candidate cycle and the number of receptions is not the same.

Figure 16:
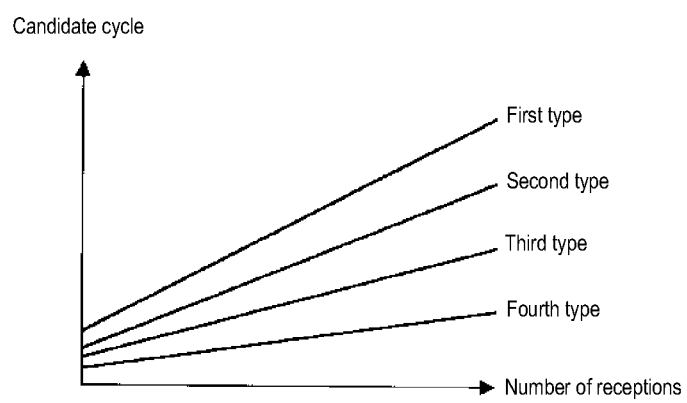
FIG. 16 is an explanatory diagram of candidate cycles of four types of data frames.

FIG. 16 is an explanatory diagram of candidate cycles for four types of data frames. FIG. 16 shows, for each of the four types of data frames, the relationship between the candidate cycle and the number of receptions. As shown in FIG. 16, for each of the four types of data frames, the larger the number of receptions, the longer the candidate cycle. For the same number of receptions, the candidate cycle for the first type of data frame is longer than the candidate cycle for the second type of data frame. The candidate cycle for the second type of data frame is longer than the candidate cycle for the third type of data frame. The candidate cycle for the third type of data frame is longer than the candidate cycle for the fourth type of data frame.

The slope of the straight line for the first type of data frame is larger than the slope of the straight line for the second type of data frame. The slope of the straight line for the second type of data frame is larger than the slope of the straight line for the third type of data frame. The slope of the straight line for the third type of data frame is larger than the slope of the straight line for the fourth type of data frame.

In the relay device 1, for each of the four types of data frames, when the amount of data relevant to the data frame stored in the temporary storage unit 21 becomes equal to or greater than the first threshold value, the cycle change frame is transmitted to the ECU that transmits the data frame, the amount of data relevant to which is equal to or greater than the first threshold value. The transmission cycle of the data frame transmitted through one of the three communication lines 3a, 3b, and 3c becomes long, so that the increase in the amount of data is suppressed. As a result, the possibility that an overflow will occur in the temporary storage unit 21 is low.

The transmission cycle of a type of data frame, the amount of data relevant to which is equal to or greater than the first threshold value, among the four types of data frames, is changed from the basic cycle to a cycle longer than the basic cycle. The transmission cycle of the type of data frame, the amount of data relevant to which is less than the first threshold value is not changed. As a result, four types of data frames are efficiently transmitted.

The larger the number of receptions, the longer the transmission cycle after change, that is, the transmission cycle determined in step S33. As a result, the transmission cycle after change is determined to be an appropriate cycle for realizing a configuration in which the possibility of overflow is low and the transmission speed of transmission data is high.

In Embodiment 2, the four first threshold values for the four types of data frames may be the same. The four second threshold values for the four types of data frames may be the same. For relationship between the candidate cycle and the number of receptions, relationships of the four types of data frames may be the same.

The number of types of data frames transmitted in the communication system N is not limited to 4, and may be 2, 3, or 5 or more. The number of types of data frames transmitted by the ECU 1a is not limited to 2, and may be 1 or 3 or more. The number of types of data frames transmitted by the ECUs 1b and 1c is not limited to 1, and may be 2 or more. For each of the ECUs 1a, 1b, and 1c, the number of timers, the number of transmission cycle data, the number of ECU-side transmission processes, and the number of cycle change processes are adjusted according to the number of types of data frames to be transmitted. For example, when the number of types of data frames transmitted by the ECU 1a is 3, the number of timers, the number of transmission cycle data, the number of ECU-side transmission processes, and the number of cycle change processes for the ECU 1a are 3. A plurality of ECUs may transmit the same type of data frames.

In Embodiments 1 and 2, the transmission cycle for transmitting a data frame is not limited to the period from the start of transmission of one data frame to the start of transmission of the next data frame. The transmission cycle may be, for example, a period from the completion of transmission of one data frame to the start of transmission of the next data frame. In this case, each of the ECUs 1a, 1b, and 1c transmits the next data frame after the transmission cycle has passed from the completion of one data frame. This transmission cycle is changed by the relay device 2.

The number of ECUs connected to the relay device 2 is not limited to 3, and may be 2 or 4 or more. The number of communication lines connected to the relay device 2 is the same as the number of ECUs. The transmission cycle determined in step S33 of the data amount adjustment process may be a fixed cycle that does not change according to the number of receptions.

It should be considered that Embodiments 1 and 2 disclosed are examples in all points and not restrictive. The scope of the present invention is defined by the claims rather than the meanings set forth above, and is intended to include all modifications within the scope and meaning equivalent to the claims.

The invention claimed is:

1. A relay device for receiving data transmitted cyclically through a communication line and transmitting the received data, comprising:
    a storage unit in which the data received through the communication line is stored;
    a first transmission unit that transmits the data stored in the storage unit;
    a deletion unit that deletes, from the storage unit, the data transmitted by the first transmission;
    a data amount determination unit that determines, for the data received through the communication line, whether or not an amount of data stored in the storage unit is equal to or greater than a threshold value; and
    a second transmission unit that transmits, through the communication line, change data which gives an instruction to change a transmission cycle for transmitting data to a longer cycle, when the data amount determination unit determines that the amount of data is equal to or greater than the threshold value.

2. The relay device according to claim 1, further comprising:
a determination unit that determines the transmission cycle after change, based on the number of data reception through the communication line within a predetermined period.

3. The relay device according to claim 2,
wherein the number of communication lines is two or more,
the data transmitted cyclically through each of the plurality of communication lines is received,
a plurality of data received through the plurality of communication lines are stored in the storage unit,
the data amount determination unit determines, for each of the plurality of data received respectively through the plurality of communication lines, whether or not the amount of data stored in the storage unit is equal to or greater than a threshold value, and
when the data amount determination unit determines that the amount of data is equal to or greater than the threshold value for at least one of the plurality of data received respectively through the plurality of communication lines, the second transmission unit transmits the change data through the communication line through which data determined that the amount of data is equal to or greater than the threshold value is transmitted.

4. The relay device according to claim 2,
wherein the number of communication lines is two or more,
a plurality of types of data that are cyclically transmitted are received through a plurality of communication lines,
the plurality of types of data received through the plurality of communication lines are stored in the storage unit,
the data amount determination unit determines, for each of the plurality of types of data, whether or not the amount of data stored in the storage unit is equal to or greater than a threshold value, and
when the data amount determination unit determines that the amount of data is equal to or greater than the threshold value for at least one type of data among the plurality of types of data, the second transmission unit transmits the change data through the communication line through which data determined that the amount of data is equal to or greater than the threshold value is transmitted.

5. The relay device according to claim 1,
wherein the number of communication lines is two or more,
the data transmitted cyclically through each of the plurality of communication lines is received,
a plurality of data received through the plurality of communication lines are stored in the storage unit,
the data amount determination unit determines, for each of the plurality of data received respectively through the plurality of communication lines, whether or not the amount of data stored in the storage unit is equal to or greater than a threshold value, and
when the data amount determination unit determines that the amount of data is equal to or greater than the threshold value for at least one of the plurality of data received respectively through the plurality of communication lines, the second transmission unit transmits the change data through the communication line through which data determined that the amount of data is equal to or greater than the threshold value is transmitted.

6. The relay device according to claim 5, wherein two of a plurality of threshold values for the plurality of data received respectively through the plurality of communication lines are different from each other.

7. The relay device according to claim 1,
wherein the number of communication lines is two or more,
a plurality of types of data that are cyclically transmitted are received through a plurality of communication lines,
the plurality of types of data received through the plurality of communication lines are stored in the storage unit,
the data amount determination unit determines, for each of the plurality of types of data, whether or not the amount of data stored in the storage unit is equal to or greater than a threshold value, and
when the data amount determination unit determines that the amount of data is equal to or greater than the threshold value for at least one type of data among the plurality of types of data, the second transmission unit transmits the change data through the communication line through which data determined that the amount of data is equal to or greater than the threshold value is transmitted.

8. The relay device according to claim 7,
wherein the type of data is determined by an application program relevant to a process using the data.

9. The relay device according to claim 8, wherein two of a plurality of threshold values for the plurality of types of data are different from each other.

10. The relay device according to claim 7, wherein two of a plurality of threshold values for the plurality of types of data are different from each other.

11. A relay method, comprising:
storing, in a storage unit, data which is cyclically transmitted from a communication device through a communication line;
transmitting the data stored in the storage unit;
deleting the transmitted data from the storage unit;
determining, for the data transmitted from the communication device through the communication line, whether or not an amount of data stored in the storage unit is equal to or greater than a threshold value; and
transmitting, through the communication line, change data which gives an instruction to change a transmission cycle for transmitting data to a longer cycle, when it is determined that the amount of data is equal to or greater than the threshold value.

12. A non-transitory computer-readable medium encoded with a computer program causing the non-transitory computer-readable medium to execute:
storing, in a storage unit, data which is cyclically transmitted from a communication device through a communication line;
giving an instruction to transmit the data stored in the storage unit;
deleting the transmitted data from the storage unit;
determining, for the data transmitted from the communication device through the communication line, whether or not an amount of data stored in the storage unit is equal to or greater than a threshold value; and
giving an instruction to transmit, through the communication line, change data which gives an instruction to change a transmission cycle for transmitting data to a longer cycle, when it is determined that the amount of data is equal to or greater than the threshold value.

\* \* \* \* \*